US006602165B2

(12) United States Patent
Ogawa et al.

(10) Patent No.: US 6,602,165 B2
(45) Date of Patent: Aug. 5, 2003

(54) CONTROL SYSTEM FOR DIRECT INJECTION SPARK IGNITION INTERNAL COMBUSTION ENGINE

(75) Inventors: Ken Ogawa, Wako (JP); Yasunori Ehara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/067,239

(22) Filed: Feb. 7, 2002

(65) Prior Publication Data

US 2002/0107107 A1 Aug. 8, 2002

(30) Foreign Application Priority Data

Feb. 7, 2001 (JP) ........................................ 2001-030841

(51) Int. Cl.[7] .............................................. B60K 41/04
(52) U.S. Cl. ........................................ 477/107; 477/111
(58) Field of Search .................................. 477/107, 111

(56) References Cited

U.S. PATENT DOCUMENTS

| 4,596,164 A | * | 6/1986 | Hasegawa et al. | ........... 477/111 |
| 4,732,130 A | * | 3/1988 | Suzuki | ........... 477/111 |
| 4,750,386 A | * | 6/1988 | Bowers et al. | ........... 477/111 |
| 4,898,138 A | * | 2/1990 | Nishimura et al. | ........... 123/399 |
| 5,209,213 A | * | 5/1993 | Miyashita et al. | ........... 477/111 |
| 5,443,594 A | * | 8/1995 | Takada et al. | ........... 477/111 |
| 5,483,939 A | * | 1/1996 | Kamura et al. | ........... 477/111 |
| 5,875,761 A | * | 3/1999 | Fujieda et al. | ........... 477/111 |
| 5,975,044 A | * | 11/1999 | Kamura et al. | ........... 123/295 |

FOREIGN PATENT DOCUMENTS

JP 2000-161098 6/2000

* cited by examiner

*Primary Examiner*—Sherry Estremsky
(74) *Attorney, Agent, or Firm*—Arent Fox Kintner Plotkin & Kahn, PLLC

(57) ABSTRACT

A control system for a direct injection spark ignition engine connected to an automatic transmission that modifies engine power in accordance with a selected one of shift programs (a normal mode for improved fuel economy and a power mode for improved performance). A torque required by the engine is determined based on the detected engine speed and the engine load in accordance with characteristics corresponding to the selected shift program. And, an engine operation mode is determined to one of three modes including a stoichiometric air/fuel ratio operation mode in which a desired air/fuel ratio is set to a stoichiometric air/fuel ratio and two lean-burn operations mode in which the desired air/fuel ratio is set to be leaner than the stoichiometric air/fuel ratio. The desired air/fuel ratio is used to correct the fuel injection amount to be supplied to the engine. With this, it becomes possible to produce the acceleration as expected by the vehicle operator throughout the operating conditions with less degradation of fuel economy, when the shift program is switched to the power mode.

23 Claims, 6 Drawing Sheets

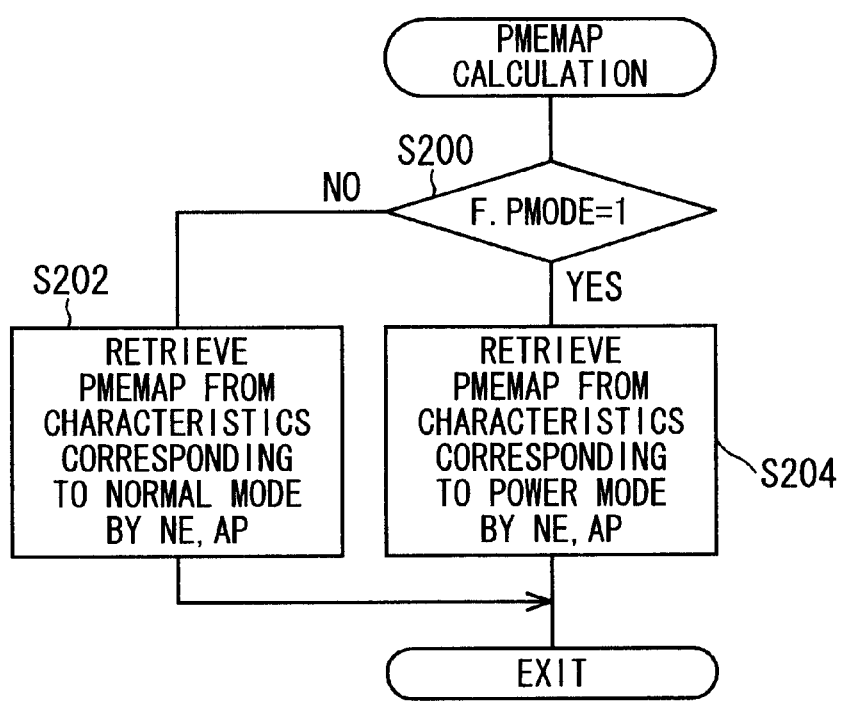

CONTROL SYSTEM FOR DIRECT INJECTION SPARK IGNITION INTERNAL COMBUSTION ENGINE

BACKGROUND OF THE INVENTION

1. Field of the Invention

This invention relates to a control system for a direct injection spark ignition internal combustion engine, more particularly to a system for controlling a direct injection spark ignition engine connected to an automatic transmission that modifies the engine power in accordance with a selected one of shift programs.

2. Description of the Related Art

Japanese Laid-Open Patent Application No. 2000-161098 teaches a system for controlling a lean-burn internal combustion engine, not a direct injection spark ignition engine, in which the lean-burn region wherein a desired air/fuel is set to be lean, is varied when the shift programs of a normal mode for improved fuel economy and a power mode for improved performance are switched therebetween, so as to suppress a shock due to torque difference caused by the switching. To be more specific, in the power mode, the lean-burn region is made narrower than that in the normal mode, or the desired air/fuel itself is made richer than that of the normal mode partially at a high load and a high engine speed or throughout the engine loads and speeds.

In this prior art, since, however, the desired air/fuel ratio in the power mode is made relatively richer than that in the normal mode, the fuel economy is disadvantageously degraded when the mode is switched to the power mode. Moreover, since the desired air/fuel ratio is immediately changed in response to the switching to the power mode, in other words, since the torque required by the engine is not determined in response to this switching, in addition to the degradation of fuel economy, acceleration is not so satisfactory, depending on the operating conditions, as expected by the vehicle operator.

SUMMARY OF THE INVENTION

An object of the present invention is therefore to provide a control system for a direct injection spark ignition internal combustion engine connected to an automatic transmission that modifies the engine torque in accordance with a selected one of shift programs, which determines the torque required by the engine in response to the switching of the shift programs and based thereon, determines an operation mode including a desired air/fuel ratio, thereby enabling to produce the acceleration as expected by the vehicle operator throughout the operating conditions with less degradation of fuel economy, when the shift program is switched to one for improved performance.

In order to achieve the object, there is provided a system for controlling an internal combustion engine in which gasoline fuel is directly injected into cylinder combustion chambers and is ignited by a spark plug, and an automatic transmission connected to the engine to modify engine power in accordance with a selected one of shift programs, comprising: engine operating condition detecting means for detecting operating conditions of the engine including at least an engine speed and an engine load; required torque determining means for determining a torque required by the engine based on the detected engine speed and the engine load in accordance with ones, of characteristics predetermined separately for the shift programs, that are corresponding to the selected shift program; operation mode determining means for determining an operation mode of the engine to one of at least three operation modes comprising a stoichiometric air/fuel ratio operation mode in which a desired air/fuel ratio to be supplied to the engine is set to a stoichiometric air/fuel ratio and lean-burn operation modes including at least a pre-mixture combustion operation mode in which the desired air/fuel ratio is set to be leaner than the stoichiometric air/fuel ratio and a stratified combustion operation mode in which the desired air/fuel ratio is set to be leaner than that of the pre-mixture combustion operation mode, based on at least the determined required torque; output fuel injection amount determining means for determining an output fuel injection amount to be supplied to the engine by correcting a basic fuel injection amount, determined based on the detected operating conditions, by the set desired air/fuel ratio of the determined operation mode; and fuel injector which directly injects fuel into the combustion chamber of the engine determined based on the output fuel injection amount.

BRIEF EXPLANATION OF THE DRAWINGS

This and other objects and advantages of the invention will be more apparent from the following description and drawings, in which:

FIG. 5 is a flow chart showing the subroutine of the determination of a basic value PMEMAP of the required torque referred to in the flow chart of FIG. 4.

DETAILED DESCRIPTION OF THE PREFERRED EMBODIMENTS

Embodiments of the present invention will now be explained with reference to the drawings.

Figure 1:
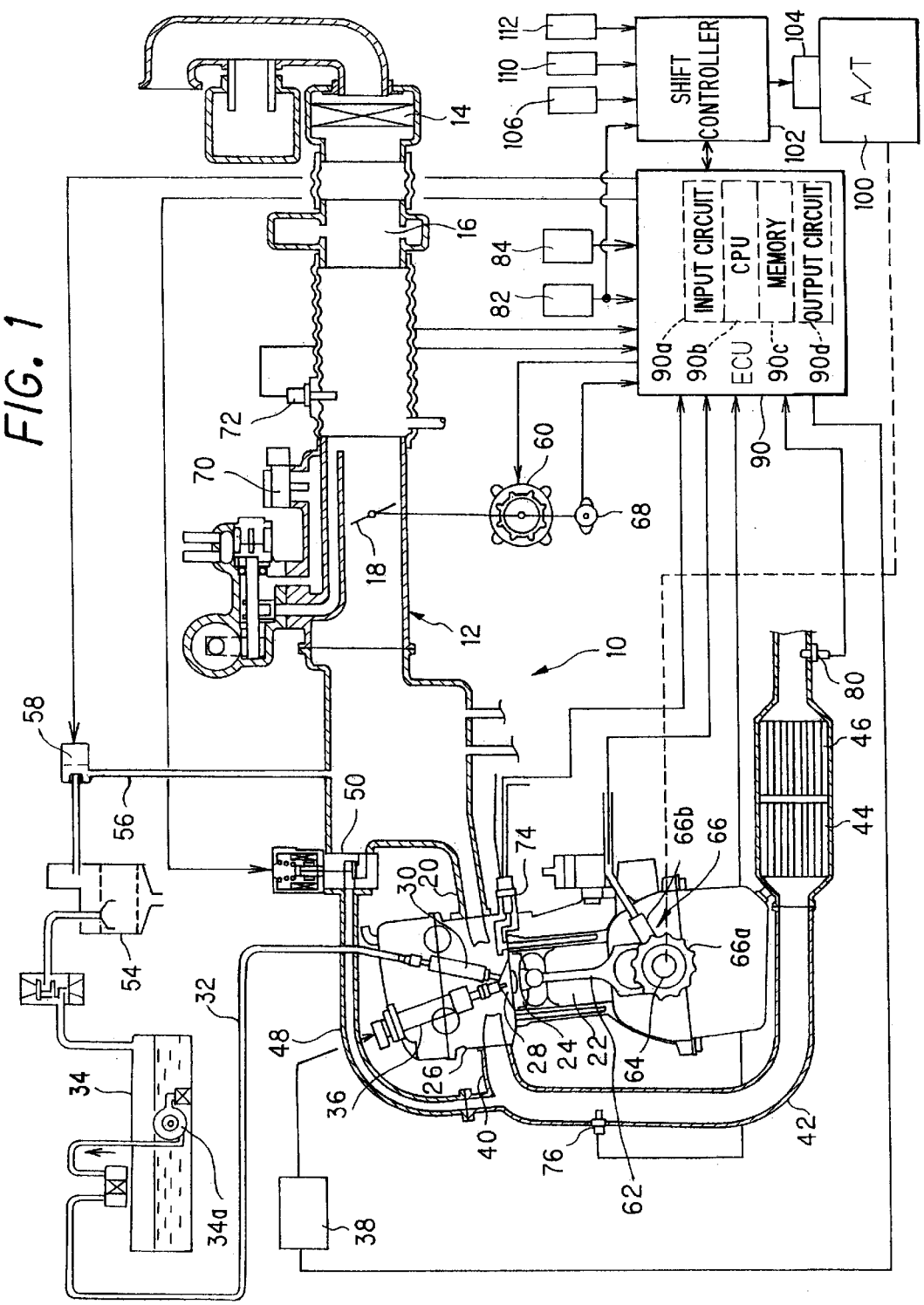
FIG. 1 is an overall schematic view showing a control system of a direct injection spark ignition internal combustion engine according to an embodiment of the invention.

FIG. 1 is an overall schematic view showing a control system for a direct injection spark ignition internal combustion engine according to an embodiment of the present invention.

Reference numeral 10 in this figure designates an OHC in-line four-cylinder internal combustion engine. Air drawn into an air intake pipe 12 through an air cleaner 14 mounted on its far end flows through a surge tank 16 and an intake manifold 20, while the flow thereof is adjusted by a throttle valve 18, to two intake valves (neither shown) of respective one of the first (#1) to fourth (#4) cylinders 22 (for brevity of illustration, only one is shown in the figure).

Each cylinder 22 has a piston 24 which is displaceable in the cylinder 22. The top of the piston 24 is recessed such that a combustion chamber 28 is formed in a space defined by the recessed piston top and the inner wall of a cylinder head. A fuel injector 30 is provided in the vicinity of the center of the ceiling of the combustion chamber 28.

The fuel injector 30 is connected, via a fuel supply pipe 32, to a fuel tank 34 and is supplied with pressurized fuel (gasoline) which is pumped by a pump 34a and is pressurized to a predetermined level by a high-pressure pump and a regulator (neither shown). The fuel injector 30 injects fuel directly into the combustion chamber 28 when opened. The injected fuel mixes with the air and forms the air-fuel mixture.

A spark plug 36 is provided in the combustion chamber 28. The spark plug 36 is supplied with electric energy from an ignition system 38 including an ignition coil (not shown) and ignites the air-fuel mixture at a predetermined ignition timing in the order of the first, the third, the fourth and the second cylinder. The resulting combustion of the air-fuel mixture drives down the piston 24.

Thus, the engine 10 is a direct injection spark ignition multi-cylinder engine in which the gasoline fuel is directly injected into the combustion chamber 28 of respective cylinders 22 through the fuel injector 30.

The exhaust gas produced by the combustion is discharged through two exhaust valves (neither shown) into an exhaust manifold 40, from where it passes through an exhaust pipe 42 to a catalytic converter 44 (for removing NOx in the exhaust gas) and a second catalytic converter 46 (three-way catalyst for removing NOx, CO and HC in the exhaust gas) to be purified and then flows out of the engine 10.

The exhaust pipe 42 is connected, at a location downstream of the confluence point of the exhaust manifold 40, to the air intake pipe 12 by an EGR conduit 48, at a position downstream of the throttle valve, so as to recirculate the exhaust gas partially in the operation of EGR (Exhaust Gas Recirculation). An EGR control valve 50 is provided at the EGR conduit 48 and is opened to recirculate a part of the exhaust gas at predetermined engine operating conditions, while regulating the flow rate of exhaust gas recirculation (EGR amount).

A canister 54 is installed and is connected to a space above the fuel level of the fuel tank 34 such that vaporized fuel is supplied to the canister 54 and is trapped in the activated charcoal filled in the canister 54. The canister 54 is connected through a purge pipe 56 to the air intake pipe 12, at a location downstream of the throttle valve 18. A canister control valve 58 is provided at the purge pipe 56 and is opened to purge a part of the vaporized fuel at predetermined engine operating conditions, while regulating the flow rate of purge (purge flow rate).

The throttle valve 18 is not mechanically linked with an accelerator pedal (not shown) installed at the floor of a vehicle operator seat (not shown), but is connected to a stepper motor 60 to be driven by the motor to open/close the air intake pipe 12. The throttle valve 18 is operated in such a DBW (Drive-By-Wire) fashion.

The piston 24 is connected to a crankshaft 64 through a connecting rod 62 to rotate the same. A crank angle sensor 66 is installed in the vicinity of the crankshaft 64, which comprises a pulser 66a fixed to the rotating crankshaft 64 and an electromagnetic pickup 66b fixed in an opposing stationery position. The crank angle sensor 66 generates a cylinder discrimination signal (named "CYL") once every 720 crank angular degrees, a signal (named "TDC" (Top Dead Center)) at a predetermined BTDC crank angular position and a unit signal (named "CRK") at 30 crank angular degrees (named "STAGE") obtained by dividing the TDC signal intervals by six.

A throttle position sensor 68 is connected to the stepper-motor 60 and generates a signal indicative of the opening degree of the throttle valve 18 (named "TH"). A manifold absolute pressure (MAP) sensor 70 is provided in the air intake pipe 12 downstream of the throttle valve 18 and generates a signal indicative of the engine load, more precisely the absolute manifold pressure (named "PBA") generated by the intake air flow there through a conduit (not shown).

An intake air temperature sensor 72 is provided at a location upstream of the throttle valve 18 and generates a signal indicative of the temperature of intake air (named "TA"). And a coolant temperature sensor 74 is installed in the vicinity of the cylinder 22 and generates a signal indicative of the temperature of an engine coolant (named "TW").

Further, a universal (or wide range) sensor (air/fuel ratio sensor) 76 is installed at the exhaust pipe 42 at a position upstream of the catalytic converters 44, 46 and generates a signal indicative of the exhaust air/fuel ratio that changes linearly in proportion to the oxygen concentration in the exhaust gas. In addition, an $O_2$ sensor (air/fuel ratio sensor) 80 is provided at a position downstream of the catalytic converters 44, 46 and generates a signal which changes each time the exhaust air/fuel turns from lean to rich and vice versa with respect to a stoichiometric air/fuel ratio.

Furthermore, an accelerator position sensor 82 is provided in the vicinity of the accelerator pedal which generates a signal indicative of the position (opening degree) of the accelerator (pedal) (named "AP") indicative of the engine load. And an atmospheric pressure sensor 84 is installed at an appropriate location of the engine 10 and generates a signal indicative of the atmospheric pressure (named "PA") of the place where a vehicle (not shown) on which the engine 10 is mounted runs.

The outputs of the sensors are sent to an ECU (Electronic Control Unit) 90. The ECU 90 comprises a microcomputer having an input circuit 90a, a CPU 90b, a memory (ROM, RAM, etc.) 90c, an output circuit 90d and a counter (not shown). The CRK signal generated by the crank angle sensor 66 is counted by the counter and the engine speed NE is detected or calculated.

The outputs of the sensors are successively sampled (most are A/D converted) and are stored in the memory 90c. The ECU 90 determines or calculates the fuel injection amount and the ignition timing based on the detected engine speed NE and the inputted other sensor outputs.

The engine 10 is connected with an automatic transmission (hereinafter referred to as "transmission") 100 (shown as "AT"). As shown by dashed lines in the figure, the transmission 100 is connected to an output (not shown) coupled to the crankshaft 64 and modifies the torque produced by the engine 10. The transmission 100 is a known multi-step transmission having five-speed forward gears and one-speed reverse gears.

A shift controller 102 is provided for controlling the operation of the transmission 100. The shift controller 102 is connected to the transmission 100 through a hydraulic control circuit 104 having electromagnetic solenoids, etc. Similar to the ECU 90, the shift controller 90 comprises a microcomputer having an input circuit, a CPU, a memory (ROM, RAM, etc.), an output circuit and a counter (all not shown). The shift controller 102 is connected to the ECU 90 to be communicated with each other.

The engine 10 and the transmission 100 are mounted on the vehicle, and a vehicle speed sensor 106 is installed in the vicinity of the driveshaft (not shown) of the vehicle and generates a signal indicative of the traveling speed of the vehicle (named "V"). The vehicle is provided with a range selector (not shown) near the vehicle operator seat which allows the vehicle operator to select one from among eight ranges comprising P, R, N, D5, D4, D3, 2 and 1 and one of two shift programs (characteristics or mapped data) prepared separately for a normal mode for improved fuel economy and a power mode for improved performance.

A range selector switch 110 is installed in the vicinity of the range selector and generates a signal indicative of the range selected by the vehicle operator, and a mode switch 112 is installed and generates a signal indicative of the mode (shift program) selected by the vehicle operator.

The outputs of these sensors are sent to the shift controller 102. The output of the accelerator position sensor 82 is sent to the shift controller 102 also.

In the range Dn, the shift controller 102 retrieves the selected one of the two programs (determined from the output of the mode switch 112) using the vehicle speed V and the accelerator position AP (indicative of the engine load) as address data to determine or calculate a desired gear SH, and conducts shift control by supplying current commands to the electromagnetic solenoids of the hydraulic control circuit 104 such that the desired gear SH is established when the detected present (current) gear NGAR is different form the desired gear SH.

In the shift program of the power mode, the desired gear SH is set to be greater in terms of the gear ratio, in other words, it is set to be in a lower gear side, than that of the normal mode at the same vehicle speed and accelerator position. Since the shift programs comprising the normal mode and the power mode are known, the illustration is omitted.

Figure 2:
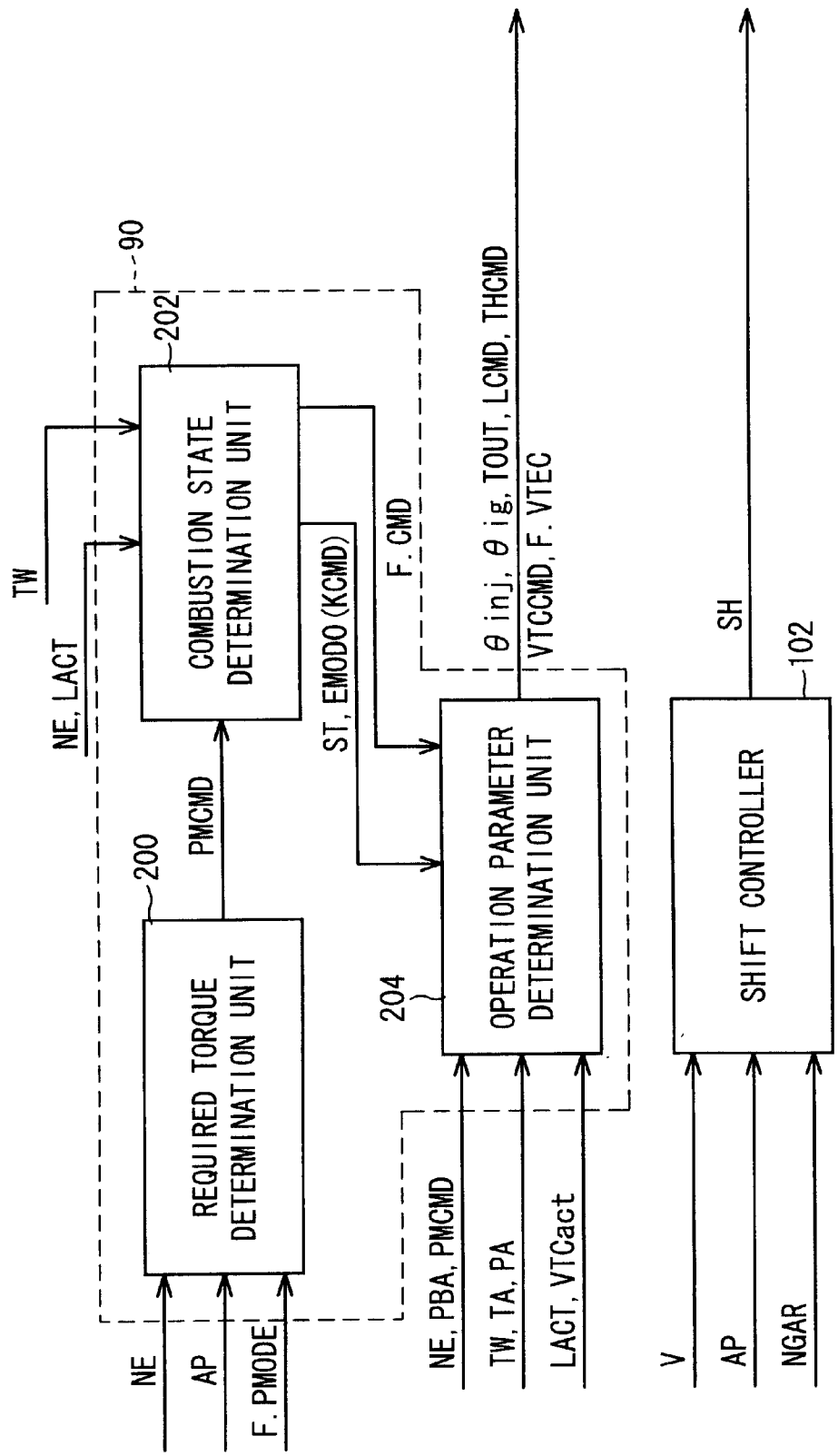
FIG. 2 is a block diagram showing the operation of the ECU and the shift controller illustrated in FIG. 1 in a functional manner.

FIG. 2 is a block diagram showing the operation of the ECU 90 and the shift controller 102 (illustrated in FIG. 1) in a functional manner.

As illustrated, the ECU 90 includes a required torque determination unit 200, a combustion state determination unit 202 and an operation parameter determination unit 204. The required torque determination unit 200 determines or calculates a required torque (a desired engine load or a vehicle operator requiring output) PMCMD required by the engine 10, based on the detected engine speed NE, the accelerator position AP and the aforesaid mode (i.e., the normal mode and the power mode which are indicated by a flag F.PMODE in the figure), as will later be explained in details.

The combustion state determination unit 202 determines an operation mode (combustion mode) based on the determine required torque PMCMD and the engine speed NE such that the fuel economy and the emission performance are optimum. More specifically, it determines the operation mode based on the determined required torque PMCMD, the detected engine speed NE and other parameters including the coolant temperature TW, the actual lift amount LACT of the EGR control valve 50, etc such that the fuel economy and the emission performance are optimum.

To be more specific, when the determined required torque PMCMD falls in the region of high engine load, the combustion state determination unit 202 determine the operation mode as a stoichiometric air/fuel ratio operation mode in which the desired air/fuel ratio KCMD supplied to the engine 10 is set to be the stoichiometric air/fuel ratio or thereabout, more specifically, in a range from 12.0:1 to 15.0:1.

When the determined required torque PMCMD falls in the region of medium engine load, the combustion state determination unit 202 determines the operation mode as a pre-mixture combustion operation mode in which the desired air/fuel ratio KCMD is set to be an air/fuel ratio leaner than the stoichiometric air/fuel ratio, more specifically, in a range from 15.0:1 to 22.0:1.

And, when the determined required torque PMCMD falls in the region of low engine load, the combustion state determination unit 202 determines the operation mode as a stratified combustion operation mode in which the desired air/fuel ratio KCMD is set to be an air/fuel ratio leaner than that of the pre-mixture combustion operation mode, more specifically in a range from 22.0:1 to 60.0:1.

Thus, the operation of the engine 10 has two kinds of lean-burn combustion operation modes comprising the pre-mixture combustion operation mode and the stratified combustion operation mode. The operation mode including fuel injection time is expressed by a label (flag) ST.EMODO and a flag F.CMD. Specifically, F.CMD=1 indicates a twice injection mode in which fuel is injected two times; F.CMD=0 and ST.EMOD0=0 indicates the stoichiometric air/fuel ratio operation mode (with one fuel injection); F.CMD=0 and ST.EMOD0=1 indicates the pre-mixture combustion operation mode (with one fuel injection), and F.CMD=0 and ST.EMOD0=2 indicates the stratified combustion operation mode (with one fuel injection).

The operation parameter determination unit 204 determines or calculates or an output fuel injection amount TOUT based on the detected engine speed NE and manifold absolute pressure PBA (indicative of engine load), etc. and conducts fuel injection through the fuel injector 30 at an injection timing $\theta$ inj (determined from the operating conditions) within the intake stroke when the operation mode is determined to be the stoichiometric air/fuel ratio operation mode or the pre-mix combustion operation mode.

And operation parameter determination unit 204 conducts ignition through the ignition system 38 and the spark plug 36 at an output ignition timing IG (determined from the operating conditions) such that the mixture of injected fuel and intake air is ignited to produce the pre-mixture combustion (uniform combustion). It conducts the fuel injection within a compression stroke (and sometimes partially at an intake stroke if necessary) to generate the stratified combustion (Direct Injection Stratified Charge) when the operation mode is determined to be the stratified combustion operation mode. It also conducts fuel injection at the intake stroke to generate the uniform combustion when the operation mode is determined to be the stoichiometric air/fuel ratio operation mode or the pre-mixture combustion operation mode.

It should be noted that the combustion state determination unit 202 determines the operation mode based on the detected engine speed NE and the determined required torque PMCMD, but the operation parameter determination unit 204 conducts the fuel injection such that the actual air/fuel ratio in the vicinity of the spark plug 36 falls within a range from 12.0:1 to 15.0:1, whichever operation mode is determined to be.

As regards the fuel injection, the operation parameter determination unit 204 determines or calculates the output fuel injection amount TOUT as follows:

$$TOUT=(TCYL-B\times TWP)/A$$

In the above, TWP is a parameter indicative of the amount of fuel injected, but adhered to the inner wall of the intake pipe 12 and is calculated or determined as follows:

$$TWP=(1-A) \times TOUT+(1-B) \times TWP(k-1)$$

In the above, A is a direct ratio of the parameter indicative of the amount fuel adhered to the intake pipe wall, B is a take-off ratio of the parameter and k is a sample number in the discrete system. TCYL is a required fuel injection amount in the cylinder concerned required by the engine 10 and is calculated or determined as follows:

$$TCYL=TIM \times KCMDM \times KAF \times KT+TT$$

In the above, TIM indicates a basic fuel injection amount obtained by retrieving predetermined mapped data using the detected engine speed NE and the manifold absolute pressure PBA as address data. The basic fuel injection amount TIM, the required fuel injection amount TCYL and the output fuel injection amount TOUT are all expressed as an opening period of the fuel injector 30. KAF indicates an air/fuel ratio feedback correction coefficient based on the output of the air/fuel ratio sensor 76. KT is the product of the other correction coefficients in multiplication form and TT is the sum of the other correction factors in additive form.

And KCMDM indicates a desired air/fuel ratio correction coefficient and is obtained by correcting the aforesaid desired air/fuel ratio KCMD by the charging efficiency.

Specifically, KCMDM is calculated or determined as follows:

$$KCMD=KBS \times KWOT \times KLEAN \times KMF$$

In the above, KBS is a basic value obtained by retrieving predetermined mapped data, corresponding to the selected operation mode, using the detected engine speed NE and the manifold absolute pressure PBA (or the required torque PMCMD) as address data. KWOT is an enrichment correction coefficient when the throttle valve 18 is fully (wide) opened. KLEAN is a lean correction coefficient at engine starting for decreasing HC. KMF is a driveability compensating air/fuel ratio correction coefficient (initially set to be 1.0).

It should be noted that, although other coefficients or factors are used in calculating the desired air/fuel ratio KCMD, since the gist of the invention does not reside in the calculation itself, no further explanation will be made. It should also be noted that the desired air/fuel ratio KCMD and the desired air/fuel ratio correction coefficient KCMDM are, in fact, expressed in the equivalence ratio.

As regards the ignition timing, the operation parameter determination unit 204 determines or calculates the output ignition timing IG as follows:

$$IG=IGMAP+IGCR$$

In the above, IGMAP is a basic ignition timing obtained by retrieving a predetermined mapped data using the detected engine speed NE and the manifold absolute pressure PBA as address data when the determined operation mode is the pre-mixture combustion operation mode or the stoichiometric air/fuel ratio operation mode, or is obtained by retrieving another predetermined mapped data using the detected engine speed NE and the required torque PMCMD as address data when the determined operation mode is the stratified combustion operation mode.

IGCR indicates the sum of correction factors and is calculated or determined as follows:

$$IGCR=IGTW+IGTA+IGADV$$

In the above, IGTW is an ignition timing correction coefficient for the engine coolant temperature TW. IGTA is a similar correction coefficient for the intake air temperature TA, and IGADV is a similar correction coefficient for the air/fuel ratio, more specifically that for advancing the ignition timing when the air/fuel ratio is set to be a lean value.

It should be noted that, although other coefficients or factors are used in calculating the ignition timing correction coefficient IGCR, since the gist of the invention does not reside in the calculation itself, no further explanation will be made.

As mentioned above, the operation parameter determination unit 204 ignites the air-fuel mixture through the ignition system 38 and the spark plug 36 at a crank angular position corresponding to the calculated ignition timing. In addition, the operation parameter determination unit 204 determines and outputs a current command LCMD to be supplied to the EGR control valve 50, a current command value THCMD (indicative of the throttle opening) to be supplied to the stepper motor 60, a command VTCCMD to be supplied to the variable valve timing mechanism (not shown), etc. Since, however, the gist of the invention does not reside in the determination of these values, no further explanation will be made.

Since the operation of the shift controller 100 has been explained with reference to FIG. 1, no explanation is repeated here.

Based on the above, the operation of the control system for a direct injection spark ignition internal combustion engine according to the embodiment of the present invention will be explained. The operation is conducted by the ECU 90, more specifically, by the required torque determination unit 200.

Figure 3:
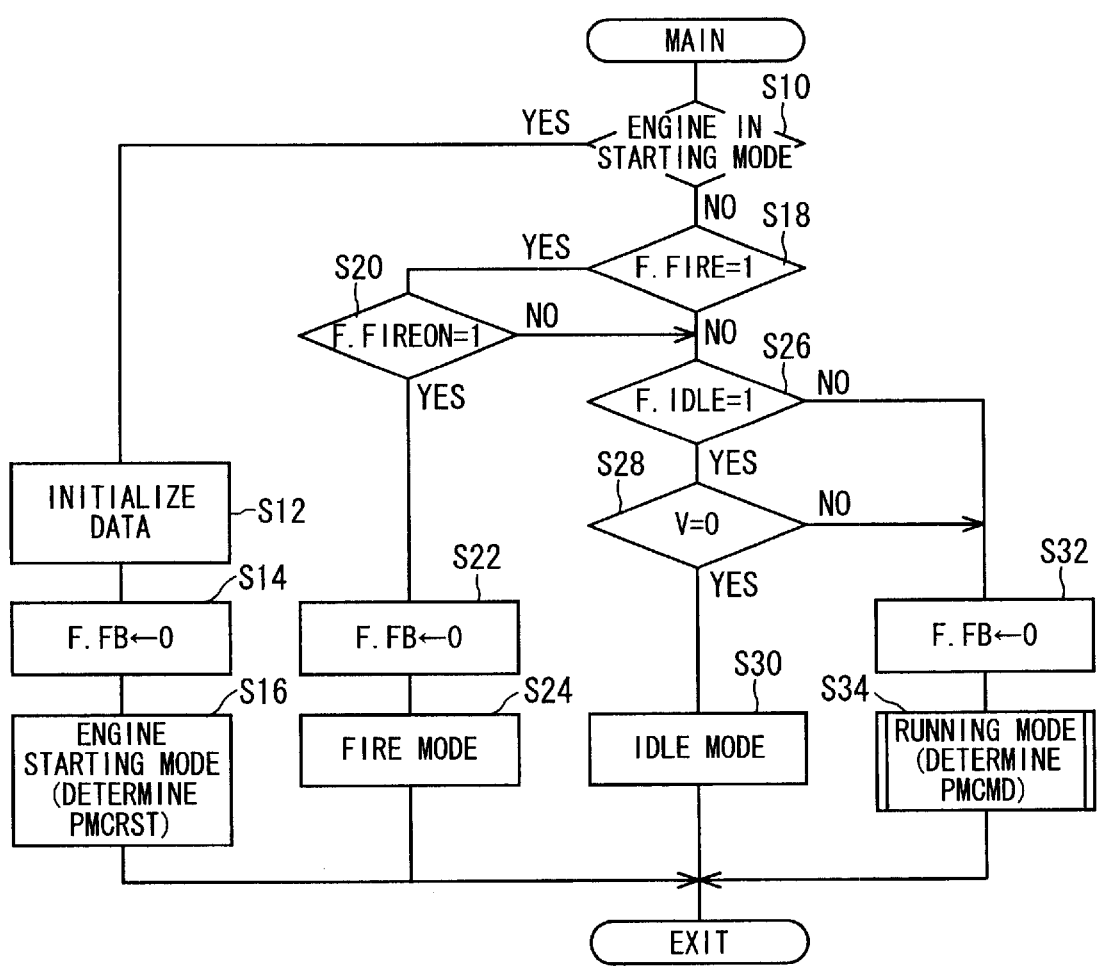
FIG. 3 is a flow chart showing the operation of the system illustrated in FIG. 1.

FIG. 3 is a flow chart showing the operation. The program illustrated there is executed at or near the TDC.

The program begins in S10 in which it is determined whether the engine 10 is in 20 a starting mode in an appropriate manner. When the result is affirmative, the program proceeds to S12 in which all of the data are set to their initial values, and proceeds to S14 in which the bit of a flag F.FB is reset to 0. To reset the bit of the flag F.FB to 0 indicates that the idle speed feedback control should not be conducted, while to set it to 1 indicates that the idle speed feedback control should be conducted. The explanation of the details of the idle speed feedback control is omitted. Then, the program proceeds to S16 in which a required torque at the engine starting mode PMCRST is determined or calculated.

When the result in S10 is negative, the program proceeds to S18 in which it is determined whether the bit of a flag F.FIRE is set to 1. The bit of this flag is set to 1 in another routine (not shown) when it is determined that a control to heat the second catalytic converter 46 and activate the same should be conducted.

The result in S18 is normally affirmative for a predetermined period of time when the result in S10 is negative and the program proceeds thereto. Therefore, the program proceeds to S20 in which it is determined whether the bit of a catalyst-heating control-permission flag F.FIREON is set to 1. When the result in S20 is affirmative, the program proceeds to S22 in which the bit of the flag F.FB is set to 1, and proceeds to S24 in which the catalyst heating control is conducted. This is expressed as "FIRE MODE" in the figure.

On the other hand, when the result in S18 or S20 is negative, the program proceeds to S26 in which it is determined whether the bit of a flag F.IDLE is set to 1. To set the bit of this flag to 1 indicates that the it is in a region where the execution of the aforesaid idle speed feedback control is possible. When the result is affirmative, the program proceeds to S28 in which it is determined whether the detected vehicle speed is zero or almost zero, and when the result is affirmative, the program proceeds to S30 in which the idle speed feedback control is conducted. This is expressed as "IDLE MODE" in the figure.

When the result in S26 or S28 is negative, the program proceeds to S32 in which the bit of the flag F.FB is reset to 0, and proceeds to S34 in which it is determined that the vehicle is running or traveling (expressed as "RUNNING MODE" in this figure) and the aforesaid torque PMCMD is determined or calculated.

Figure 4:
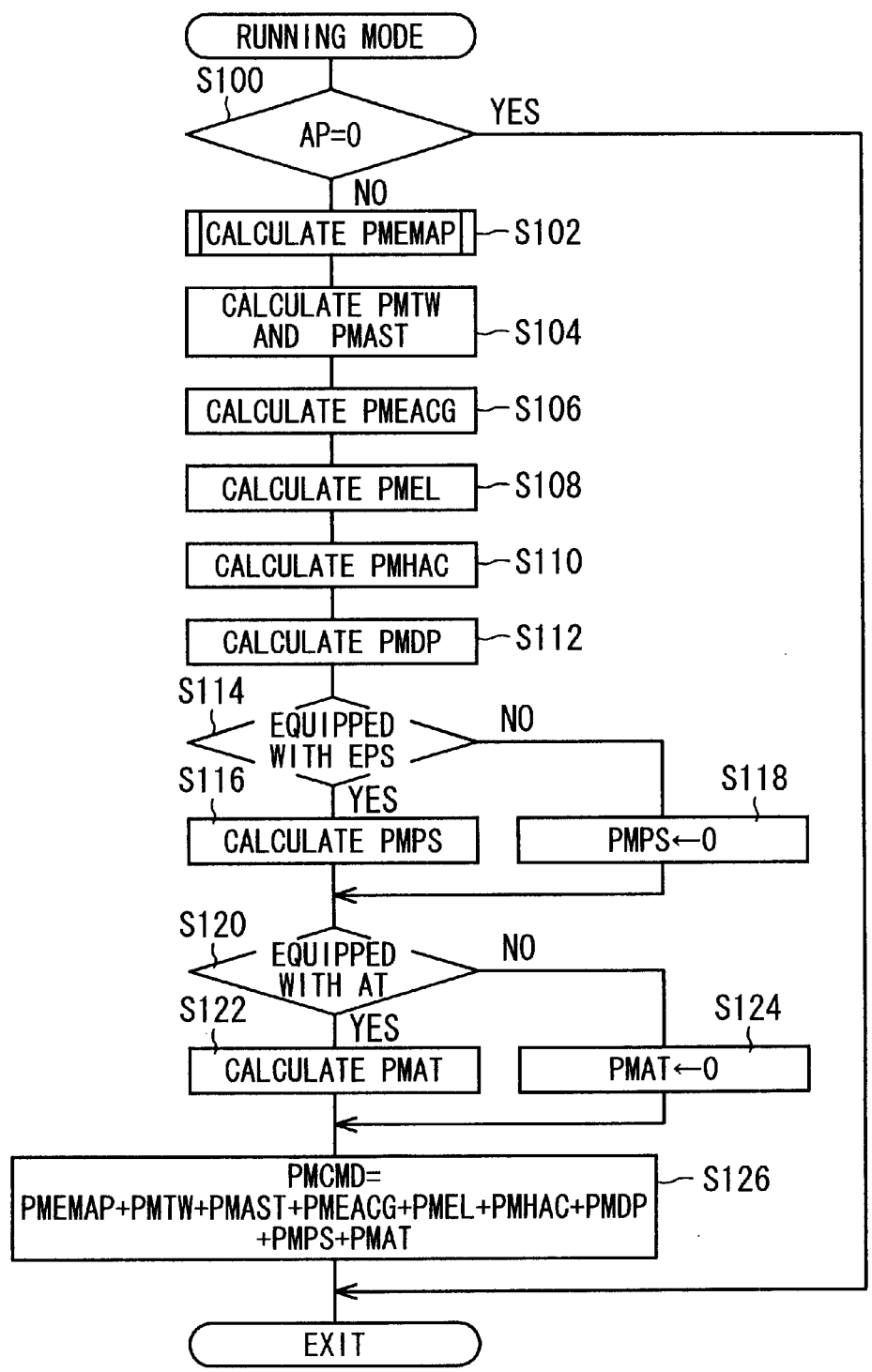
FIG. 4 is a flow chart showing the subroutine of the determination of a required torque PMCMD referred to in the flow chart of FIG. 3.

FIG. 4 is a flow chart showing the subroutine of this required torque determination.

In the figure, the program begins in S100 in which it is determined whether the accelerator position AP is zero, in other words, it is determined whether the vehicle operator does not depress the accelerator (pedal). When the result is negative, the program proceeds to S102 in which a basic value PMEMAP of the required torque PMCMD is calculated or retrieved.

FIG. 5 is a flow chart showing the subroutine of this basic value determination.

As illustrated, the program proceeds to S200 in which it is determined whether the bit of a flag F.PMODE is set to 1. The bit of this flag is set to 1 or reset to 0 in a routine (not shown) in response to the output of the aforesaid mode switch 112. Specifically, when the switch output indicates that the vehicle operator selects the normal mode, the bit of this flag is reset to 0, whereas the bit of this flag is set to 1 when the vehicle operator selects the power mode.

When the result in S200 is negative, the program proceeds to S202 in which, as mentioned above, the required torque basic value PMEMAP is calculated or retrieved from predetermined characteristics of the required torque (corresponding to the normal mode) using the detected engine speed NE and accelerator position AP as address data. The characteristics of the required torque are predetermined separately for the two shift programs for the normal mode and for the power mode and in this step, the one corresponding to the normal mode is retrieved in this step.

Figure 6A:
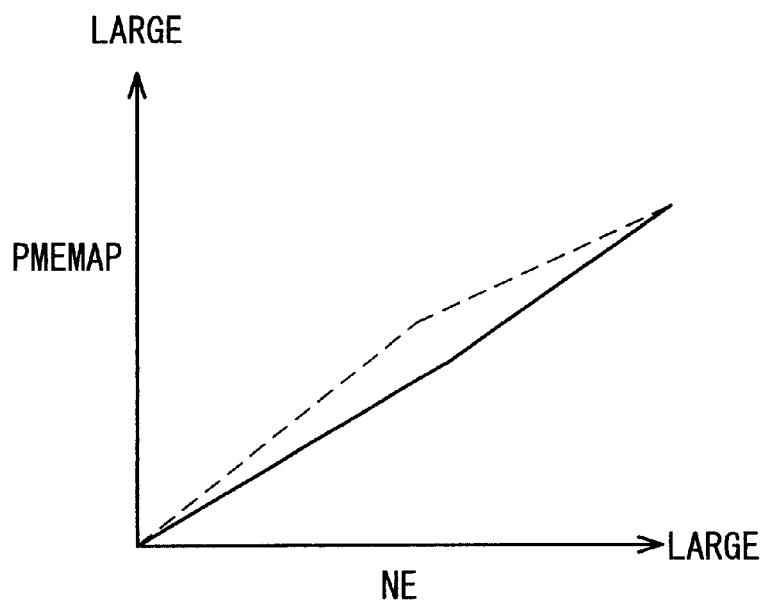
FIGS. 6A and 6B is a set of graphs showing the characteristics of the basic value PMEMAP of the required torque PMCMD predetermined separately for the shift programs of the normal mode and the power mode referred to in the flow chart of FIG. 5.
Figure 6B:
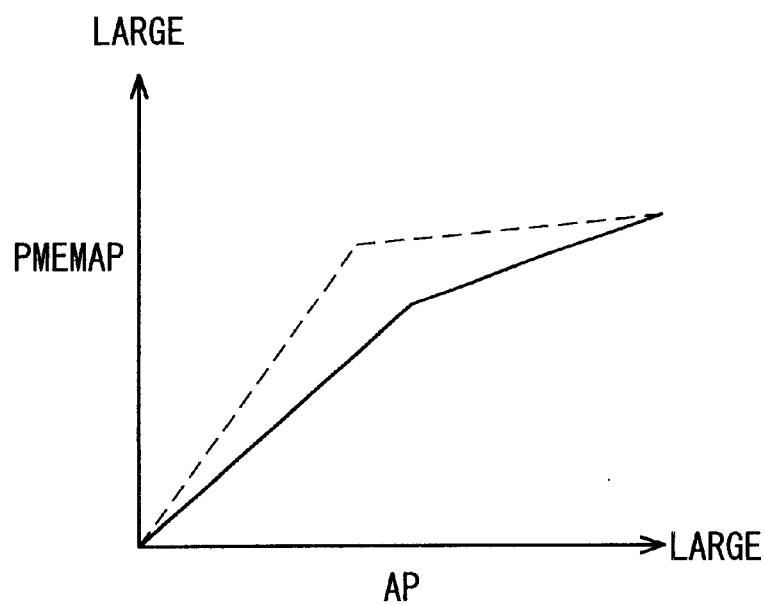

FIGS. 6A and 6B are graphs showing the characteristics of the required torque (more precisely, the basic value PMEMAP of the required torque PMCMD). FIG. 6A shows the characteristic of PMEMAP set relative to the engine speed NE assuming that the accelerator position AP is constant, and FIG. 6B shows the characteristic of PMEMAP set relative to the accelerator position AP assuming that the engine speed NE is constant. In the figures, the solid line indicate the characteristics for the normal mode, while the dashed line indicates the characteristics for the power mode.

These characteristics are predetermined or preset relative to the engine speed NE and the accelerator position AP through experimentation in such a way that the fuel economy and the emission performance are optimum. More precisely, the characteristic for the power mode is predetermined greater than that for the normal mode such that the acceleration is improved, i.e., the acceleration performance is given priority over the fuel economy.

Returning to the explanation of the flow chart of FIG. 5, when the result in S200 is affirmative, the program proceeds to S204 in which the required torque basic value PMEMAP is calculated or retrieved from the predetermined characteristics (corresponding to the power mode) using the same parameters as address data.

Returning to the explanation of the flow chart of FIG. 4, the program proceeds to S104 in which a required torque correction factor (coefficient) PMTW for the coolant temperature TW and a required torque correction factor PMAST for post-engine-starting are calculated or retrieved from appropriate characteristics (not shown).

The program then proceeds to S106 in which a required torque correction factor PMEACG for compensating the loss of torque consumed to drive an alternator ACG (illustration omitted in the figures) is calculated or retrieved from appropriate characteristics (not shown).

The program then proceeds to S108 in which a required torque correction factor PMEL for compensating the loss of torque consumed to drive electric equipments (excluding an air conditioner) is calculated or retrieved from appropriate characteristics (not shown).

The program then proceeds to S110 in which a required torque correction factor PMHAC for compensating the loss of torque consumed to drive the air conditioner (illustration omitted in the figures) is calculated or retrieved from appropriate characteristics (not shown). The program then proceeds to S112 in which a required torque correction factor PMDP for a dashpot (damping) control is calculated or retrieved from appropriate characteristics (not shown).

The program then proceeds to S114 in which it is determined whether the vehicle on which the engine 10 is mounted is provided with an EPS (Electric Power Assist System; illustration omitted in the figure) comprising an electric motor to assist the rotation of the steering wheel by the vehicle operator. When the result is affirmative, the program proceeds to S116 in which a required torque correction factor PMPS for compensating the loss of torque consumed to drive the EPS is calculated or retrieved from appropriate characteristics (not shown). On the other hand, when the result is negative, the program proceeds to S118 in which the required torque correction factor PMPS is set to zero.

The program then proceeds to S120 in which it is determined whether the vehicle on which the engine 10 is mounted is provided with the automatic transmission AT. Since the vehicle in this embodiment has the transmission 100, the result is naturally affirmative and the program proceeds to S122 in which a required torque correction factor PMAT corresponding to the load of the torque converter in operation at engine idling is calculated or retrieved from appropriate characteristics (not shown). On the other hand, when the result is negative, the program proceeds to S124 in which the required torque correction factor PMAT is set to zero.

The program then proceeds to S126 in which the determined or calculated correction factors (coefficients) are added to the calculated (retrieved) basic value PMEMAP to determine or calculate the required torque PMCMD. When the result in S100 is negative, the program is immediately terminated.

Having been configured in the foregoing manner, in response to the switching of the shift programs comprising the normal mode and the power mode, the system according to this embodiment determines or calculates the required torque PMCMD required by the engine, more precisely, the basic value PMEMAP of the required torque PMCMD based on the engine speed NE and the accelerator position AP and determines or calculates the required torque PMCMD by adding various correction factors to the basic value PMEMAP. Moreover, the system determines the operation mode including the desired air/fuel ratio KCMD using the calculated required torque PMCMD and in addition, determines or calculates the output fuel injection amount TOUT by correcting the basic fuel injection amount TIM by the values including the desired air/fuel ratio KCMD.

With this, when the mode is switched to the power mode, the system can produce the acceleration performance as desired or expected by the vehicle operator irrespectively of the operating conditions with a minimum degradation of fuel economy.

Moreover, since the system can make it unnecessary to prepare and store the desired air/fuel ratio KCMD separately for the shift programs (the normal mode and the power mode) in the memory 90 of the ECU 90, it case reduce the capacity of the memory 90c.

The embodiment is configured to have a system for controlling an internal combustion engine (10) in which gasoline fuel is directly injected into cylinder combustion chambers (28) and is ignited by a spark plug (36), and an automatic transmission (100) connected to the engine to modify engine power in accordance with a selected one of shift programs (a normal mode and a power mode), comprising: engine operating condition detecting means (crank angle sensor 66, accelerator position sensor 82, ECU 90, required torque determination unit 200, etc.) for detecting operating conditions of the engine including at least an engine speed NE and an engine load (accelerator position AP); required torque determining means (ECU 90, required torque determination unit 200, S34, S100 to S102, S200 to S204) for determining a torque required PMCMD, more precisely, a basic value PMEMAP, by the engine based on the detected engine speed and the engine load in accordance with ones, of characteristics predetermined separately for the shift programs, that are corresponding to the selected shift program; operation mode determining means (ECU 90, combustion state determination unit 202) for determining an operation mode of the engine to one of at least three operation modes comprising a stoichiometric air/fuel ratio operation mode in which a desired air/fuel ratio KCMD to be supplied to the engine is set to a stoichiometric air/fuel ratio and lean-burn operation modes including at least a pre-mixture combustion operation mode in which the desired air/fuel ratio is set to be leaner than the stoichiometric air/fuel ratio and a stratified combustion operation mode in which the desired air/fuel ratio is set to be leaner than that of the pre-mixture combustion operation mode, based on at least the determined required torque PMCMD; output fuel injection amount determining means (ECU 90, operation parameter determination unit 204) for determining an output fuel injection amount TOUT to be supplied to the engine by correcting a basic fuel injection amount TIM by the set desired air/fuel ratio KCMD of the determined operation mode; and fuel injector (30) which directly injects fuel into the combustion chamber of the engine determined based on the output fuel injection amount.

In the system, the required torque determining means includes; shift program discriminating means (ECU 90, required torque determination unit 200, S34, S100 to S102, S200) for discriminating which one of the shift programs is selected by the vehicle operator; basic required torque determining means (ECU 90, required torque determination unit 200, S34, S100 to S102, S200 to S204) for determining a basic value PMEMAP of the required torque PMCMD in accordance with the characteristics corresponding to the selected shift program based on the detected engine speed and the engine load; correction factor calculating means (ECU 90, required torque determination unit 200, S34, S104 to S124) for calculating correction factors including at least one for correcting for a coolant temperature PMTW detected by the operation condition detecting means; and required torque calculating means (ECU 90, required torque determination unit 200, S34, S126) for calculating the required torque by correcting the basic value of the required torque by the calculated correction factors.

In the system, the operation mode determining means determines the operation mode based on at least the determined required torque PMCMD and the detected engine speed NE.

In the system, the required torque determining means determines the required torque PMCMD when the engine is not subject to an idle speed control (S26, S34).

In the system, the required torque determining means determines the required torque PMCMD when a vehicle on which the engine is mounted is determined to be running (S28, S34).

In the system, the required torque determining means determines the required torque PMCMD when the accelerator is depressed by the vehicle operator (S100).

In the system, the shift programs comprises at least a normal mode for improved fuel economy and a power mode for improved performance.

In the system, the characteristics are predetermined separately for the normal mode and the power mode such that the required torque of the power mode is greater than that of the normal mode.

In the system, the engine load is determined by a position of an accelerator AP of a vehicle on which the engine is mounted.

It should be noted in the above that "at least" means that any other parameter(s) or value(s) may added or may instead be used.

It should also be noted that, although the two kinds of the normal mode and the power mode) have been described as examples of the shift modes, the present invention can not be limited thereto and any other mode can be added thereto.

It should further be noted that, although the present invention has been described with reference to a direct injection spark ignition engine, the invention can also be applied to a normal internal combustion engine in which the gasoline fuel is injected before the intake valves, when the engine is operated in the stoichiometric air/fuel ratio operation mode and the lean-burn operation mode.

It should further be noted that, although the present invention has been described with reference to the engine whose throttle valve is driven by a stepper motor, the invention will also be applied to other type of the engine whose throttle value is driven by a similar actuator such as a torque motor and DC motor.

The entire disclosure of Japanese Patent Application No. 2001-030,841 filed on Feb. 7, 2001, including specification, claims, drawings and summary, is incorporated herein in reference in its entirety.

While the invention has thus been shown and described with reference to specific embodiments, it should be noted that the invention is in no way limited to the details of the described arrangements but changes and modifications may be made without departing from the scope of the appended claims.

What is claimed is:

1. A system for controlling an internal combustion engine in which gasoline fuel is directly injected into cylinder combustion chambers and is ignited by a spark plug, and an automatic transmission connected to the engine to modify engine power in accordance with a selected one of shift programs, comprising:

engine operating condition detecting means for detecting operating conditions of the engine including at least an engine speed and an engine load;

required torque determining means for determining a torque required by the engine based on the detected engine speed and the engine load in accordance with ones, of characteristics predetermined separately for the shift programs, that are corresponding to the selected shift program;

operation mode determining means for determining an operation mode of the engine to one of at least three operation modes comprising a stoichiometric air/fuel ratio operation mode in which a desired air/fuel ratio to be supplied to the engine is set to a stoichiometric air/fuel ratio and lean-burn operation modes including at least a pre-mixture combustion operation mode in which the desired air/fuel ratio is set to be leaner than the stoichiometric air/fuel ratio and a stratified combustion operation mode in which the desired air/fuel ratio is set to be leaner than that of the pre-mixture combustion operation mode, based on at least the determined required torque;

output fuel injection amount determining means for determining an output fuel injection amount to be supplied to the engine by correcting a basic fuel injection amount, determined based on the detected engine operating conditions, by the set desired air/fuel ratio of the determined operation mode; and fuel injector which directly injects fuel into the combustion chamber of the engine determined based on the output fuel injection amount.

2. A system according to claim 1, wherein the required torque determining means includes;

shift program discriminating means for discriminating which one of the shift programs is selected by a vehicle operator;

basic required torque determining means for determining a basic value of the required torque in accordance with the characteristics corresponding to the selected shift program based on the detected engine speed and the engine load;

correction factor calculating means for calculating correction factors including at least one for correcting for a coolant temperature detected by the operation condition detecting means; and required torque calculating means for calculating the required torque by correcting the basic value of the required torque by the calculated correction factors.

3. A system according to claim 2, wherein the shift programs comprises at least a normal mode for improved fuel economy and a power mode for improved performance.

4. A system according to claim 3, wherein the characteristics are predetermined separately for the normal mode and the power mode such that the basic value of the required torque of the power mode is greater than that of the normal mode.

5. A system according to claim 1, wherein the operation mode determining means determines the operation mode based on at least the determined required torque and the detected engine speed.

6. A system according to claim 1, wherein the required torque determining means determines the required torque when the engine is not subject to an idle speed control.

7. A system according to claim 1, wherein the required torque determining means determines the required torque when a vehicle on which the engine is mounted is determined to be running.

8. A system according to claim 7, wherein the required torque determining means determines the required torque when the accelerator is depressed by the vehicle operator.

9. A system according to claim 1, wherein the shift programs comprise at least a normal mode for improved fuel economy and a power mode for improved performance.

10. A system according to claim 9, wherein the characteristics are predetermined separately for the normal mode and the power mode such that the required torque of the power mode is greater than that of the normal mode.

11. A system according to claim 1, wherein the engine load is determined by a position of an accelerator of a vehicle on which the engine is mounted.

12. A method of controlling an internal combustion engine in which gasoline fuel is directly injected into cylinder combustion chambers and is ignited by a spark plug, and an automatic transmission connected to the engine to modify engine power in accordance with a selected one of shift programs, comprising the steps of:

(a) detecting operating conditions of the engine including at least an engine speed and an engine load;

(b) determining a torque required by the engine based on the detected engine speed and the engine load in accordance with ones, of characteristics predetermined separately for the shift programs, that are corresponding to the selected shift program;

(c) determining an operation mode of the engine to one of at least three operation modes comprising a stoichiometric air/fuel ratio operation mode in which a desired air/fuel ratio to be supplied to the engine is set to a stoichiometric air/fuel ratio and lean-burn operation modes including at least a pre-mixture combustion operation mode in which the desired air/fuel ratio is set to be leaner than the stoichiometric air/fuel ratio and a stratified combustion operation mode in which the desired air/fuel ratio is set to be leaner than that of the pre-mixture combustion operation mode, based on at least the determined required torque;

(d) determining an output fuel injection amount to be supplied to the engine by correcting a basic fuel injection amount, determined based on the detected operating conditions, by the set desired air/fuel ratio of the determined operation mode; and (e) injecting fuel into the combustion chamber of the engine determined based on the output fuel injection amount.

13. A method according to claim 12, wherein the step (b) includes the steps of;

(f) discriminating which one of the shift programs is selected by a vehicle operator;

(g) determining a basic value of the required torque in accordance with the characteristics corresponding to the selected shift program based on the detected engine speed and the engine load;

(h) calculating correction factors including at least one for correcting for a coolant temperature; and (i) calculating the required torque by correcting the basic value of the required torque by the calculated correction factors.

14. A method according to claim 13, wherein the shift programs comprise at least a normal mode for improved fuel economy and a power mode for improved performance.

15. A method according to claim 14, wherein the characteristics are predetermined separately for the normal mode and the power mode such that the basic value of the required torque of the power mode is greater than that of the normal mode.

16. A method according to claim 12, wherein the step (c) determines the operation mode based on at least the determined required torque and the detected engine speed.

17. A method according to claim 12, wherein the step (b) determines the required torque when the engine is not subject to an idle speed control.

18. A method according to claim 12, wherein the step (b) determines the required torque when a vehicle on which the engine is mounted is determined to be running.

19. A method according to claim 18, wherein the step (b) determines the required torque when the accelerator is depressed by the vehicle operator.

20. A method according to claim 12, wherein the shift programs comprise at least a normal mode for improved fuel economy and a power mode for improved performance.

21. A method according to claim 20, wherein the characteristics are predetermined separately for the normal mode and the power mode such that the required torque of the power mode is greater than that of the normal mode.

22. A method according to claim 12, wherein the engine load is determined by a position of an accelerator of a vehicle on which the engine is mounted.

23. A computer program embodied on a computer-readable medium for controlling an internal combustion engine in which gasoline fuel is directly injected into cylinder combustion chambers and is ignited by a spark plug, and an automatic transmission connected to the engine to modify engine power in accordance with a selected one of shift programs, comprising the steps of:

(a) detecting operating conditions of the engine including at least an engine speed and an engine load;

(b) determining a torque required by the engine based on the detected engine speed and the engine load in accordance with ones, of characteristics predetermined separately for the shift programs, that are corresponding to the selected shift program;

(c) determining an operation mode of the engine to one of at least three operation modes comprising a stoichiometric air/fuel ratio operation mode in which a desired air/fuel ratio to be supplied to the engine is set to a stoichiometric air/fuel ratio and lean-burn operation modes including at least a pre-mixture combustion operation mode in which the desired air/fuel ratio is set to be leaner than the stoichiometric air/fuel ratio and a stratified combustion operation mode in which the desired air/fuel ratio is set to be leaner than that of the pre-mixture combustion operation mode, based on at least the determined required torque;

(d) determining an output fuel injection amount to be supplied to the engine by correcting a basic fuel injection amount, determined based on the detected operating conditions, by the set desired air/fuel ratio of the determined operation mode; and (e) injecting fuel into the combustion chamber of the engine determined based on the output fuel injection amount.

* * * * *